(12) United States Patent
Senma

(10) Patent No.: US 6,259,028 B1
(45) Date of Patent: Jul. 10, 2001

(54) GROMMET HOLDER AND METHOD OF BENDING AND GUIDING A WIRING HARNESS

(75) Inventor: Shinsuke Senma, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/361,314

(22) Filed: Jul. 27, 1999

(30) Foreign Application Priority Data

Jul. 28, 1998 (JP) .................................................. 10-212581

(51) Int. Cl.[7] ...................................................... H02G 3/22
(52) U.S. Cl. .................... 174/72 A; 174/166 R; 174/152 G; 439/464
(58) Field of Search ................... 174/31 R, 151, 174/152 R, 152 G, 153 G, 154, 166 R, 71 R, 72 A, 73.1, 135, 136; 439/464, 471

(56) References Cited

U.S. PATENT DOCUMENTS

| | | | |
|---|---|---|---|
| 3,818,420 | * | 6/1974 | Barr ...................................... 439/471 |
| 4,090,764 | * | 5/1978 | Maisby et al. ........................ 439/464 |
| 4,638,964 | * | 1/1987 | Sovacool et al. ................. 174/152 G |
| 5,792,995 | * | 8/1998 | Takeda et al. ..................... 174/153 G |
| 5,994,645 | * | 11/1999 | Suzuki et al. ....................... 174/72 A |
| 6,051,790 | * | 4/2000 | Takeuchi et al. ................... 174/72 A |
| 6,079,764 | * | 6/2000 | Suzuki et al. ....................... 174/72 A |
| 6,119,305 | * | 9/2000 | Loveall et al. ................... 174/152 G |

FOREIGN PATENT DOCUMENTS 9-35537  2/1997 (JP) .

* cited by examiner

Primary Examiner—Dean A. Reichard
Assistant Examiner—Adolfo Nino
(74) Attorney, Agent, or Firm—Greenblum & Bernstein. P.L.C.

(57) ABSTRACT

A grommet holder capable of bending and guiding a wiring harness. The grommet holder includes a grommet holding portion having a grommet mounting hole configured to interconnect with a grommet, the grommet configured to accept a wiring harness therein. The grommet holder also includes a wiring harness fastening portion integrally connected to the grommet holding portion, and forming a predetermined angle with respect to the grommet holding portion. The wiring harness is affixed to the wiring harness fastening portion by a fastening device. Also provided is a method of bending a wiring harness using a grommet holder.

10 Claims, 5 Drawing Sheets

PRIOR ART

GROMMET HOLDER AND METHOD OF BENDING AND GUIDING A WIRING HARNESS

BACKGROUND OF THE INVENTION

1. Field of the Invention

The present invention relates to a grommet holder and method of bending a wiring harness, and more particularly, to a grommet holder and method for bending and guiding a wiring harness.

2. Description of Background Information

Wiring harnesses used in automobiles are often mounted at predetermined positions and are connected with respective electrical devices installed in, for example, an automobile. Wiring harnesses often have to be bent at predetermined angles for connecting respective electrical devices, depending on the position and direction of the device.

In Japanese Unexamined Patent Publication No. (Hei) 9-35537, shown in FIG. 5, a known bending device 100 for bending a wiring harness W/H is shown. A heat shrink sheet 3 is wound around the around the portion of wiring harness W/H to be bent, and both ends of the device 100 are fastened with tape. Then, the inner side to be bent is heated, resulting in only the inside portion 3a of the heat shrink sheet 3 being shrunk.

To connect a wiring harness with this known bending device 100, each wire S of wiring harness W/H is inserted into a grommet 2 which is mounted on the grommet holder 1 for easier wire connection, as shown in FIG. 6. Each wire is guided so that each wire S is at a predetermined interval in accordance with a connecting end of a device to be wired (not illustrated). The end portion of each wire S may then be connected with the device to be wired, for installation in an automobile.

Therefore, when connecting the wiring harness with a device to be wired along a bent path, for instance, it is necessary to use both the heat shrink sheet and the grommet holder in combination, which necessitates an increased number of parts and presents a problem of increasing manufacturing processes with a resulting increase in cost. Moreover, the heat shrink sheet requires the application of a heat process that is dangerous and laborious, and requires difficulty in setting the required predetermined angle when bending the wiring harness.

SUMMARY OF THE INVENTION

The present invention provides a device and method for bending a wiring harness at a predetermined angle without increasing the number of parts and production processes. The grommet holder of the present invention includes a grommet holding portion having a grommet mounting hole configured to interconnect with a grommet, the grommet being configured to accept a wiring harness therein. Also provided is a wiring harness fastening portion integrally connected to the grommet holding portion, and forming a predetermined angle with respect to the grommet holding portion. The wiring harness is affixed to the wiring harness fastening portion by a fastening device.

The grommet holder may further include a generally V-shaped bent portion having a point and extending in a generally perpendicular direction between the grommet holding portion and the wiring harness fastening portion. The V-shaped bent portion provides for the bending of the wiring harness in contact with the point of the V-shaped bent portion, and further provides for the bending of the wiring harness in a direction generally perpendicular to the grommet holding portion.

The V-shaped bending portion of the grommet holder sets a bending portion and a bending angle of wiring harness, thereby reducing the biasing force that would otherwise return the grommet to a linear shape, by positioning the wiring harness perpendicular to the grommet holding portion.

The grommet holder may also include a stop provided on the grommet holding portion adapted to be fastened to the counterpart of the holder fastening unit. By providing a stop on the grommet holding portion, the grommet holder can be fastened onto a counterpart of a holder fastening unit.

Also, the grommet holder may include a connecting portion connecting the grommet holding portion to the wiring harness fastening portion, the connecting portion having a first end forming a generally perpendicularly extending, generally L-shaped member with the grommet holding portion, the connecting portion further having a second end connected to the fastening portion.

The generally L-shaped grommet holder can bend the wiring harness at a greater radius and can reduce a load due to the bending of the wiring harness. In addition, by properly setting the predetermined angle, it is possible to provide a bending portion of the wiring harness at a higher elevation than a horizontal connecting portion of the wiring harness. Thus, the harness may be bent without interference from other parts present beneath the horizontal portion of the wiring harness.

The method of bending a wiring harness using a grommet holder includes inserting a wire of the wiring harness through the grommet mounting hole, inserting the grommet into the grommet mounting hole, and fastening the wiring harness to the wiring harness fastening portion. The method may also include bending the wiring harness in contact with a bent portion of the grommet holder.

The grommet holder of the present invention allows the wiring harness to be bent to a predetermined angle without the use of other devices. In addition, when fastening the grommet holder to a device to be wired, or the like, no load is borne by the connecting portion between the wires and the device to be wired, because the load can be borne by the grommet holder even when the load is transferred to the wiring harness, thereby resulting in increased wiring harness performance. Furthermore, there is no increase in the number of parts, which eliminates the heating process, thereby reducing the production costs of the invention.

DETAILED DESCRIPTION OF THE INVENTION

Figure 1A:
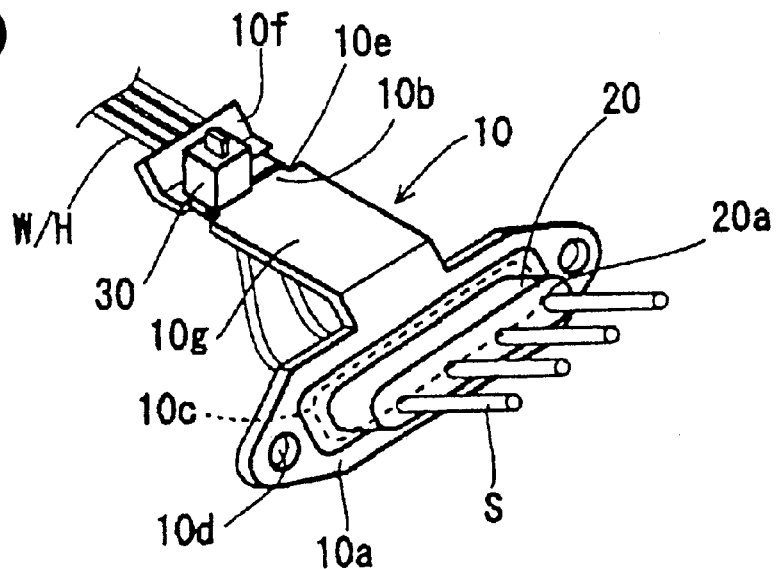
FIG. 1(A) shows a perspective view of a grommet holder according to a first embodiment of the present invention.
Figure 1B:
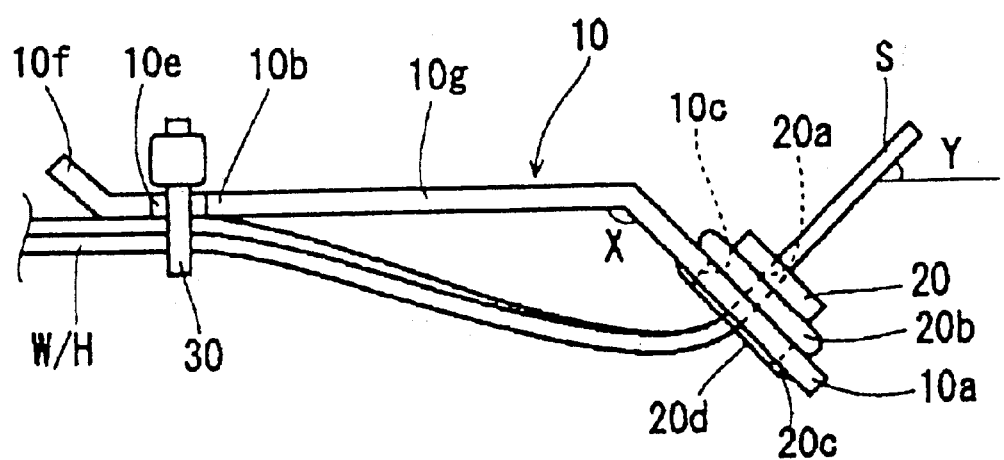
FIG. 1(B) shows a side elevational view of a grommet holder according to the first embodiment.

Referring to the drawings wherein like numerals represent like elements, FIGS. 1(A) and 1(B) show a first embodiment of the grommet holder 10 according to the present invention. The grommet holder 10 bends a wiring harness W/H and is provided with a grommet holding portion 10a at a distal end of the grommet holder which interconnects with a grommet 20. A wiring harness fastening portion 10b which fastens with the wiring harness W/H by a fastening device, such as a conventional binder 30 (shown in detail in FIG. 2), is provided at the proximal end of the grommet holder 10.

The grommet holding portion 10a is also provided with a pair of penetration holes 10d for accepting a bolt therethrough as a stop of the grommet mounting hole 10c and the grommet holder 10. When the grommet holder 10 is not fastened to a device to be wired, provision of the penetration holes 10d may not be necessary.

The wiring harness fastening portion 10b is provided with a concave notch 10e on both sides thereof to prevent the fastening device 30 from sliding axially along the length of the grommet holder. In addition, a proximal end 10f of the wiring harness fastening portion 10b is bent upwardly so that the wiring harness W/H is not damaged by the grommet holder 10.

The grommet holding portion 10a and the wiring harness fastening portion 10b are unitarily connected by a connecting portion 10g. The grommet holding portion 10a and the wiring harness fastening portion 10b are positioned at a predetermined angle with respect to one another. The predetermined angle may be set to a desired angle for bending the wiring harness W/H. The wiring harness W/H is generally perpendicularly arranged with respect to the grommet holding portion 10a. Angle X, which is between the grommet holding portion 10a and the wiring harness fastening portion 10b (shown in FIG. 1(B)), and bending angle Y (also shown in FIG. 1 (B)) which is between the horizontal portion of wiring harness W/H, have the relationship of Y=X−90, thereby allowing bending angle Y of the wiring harness W/H to be set.

The grommet 20 to be interconnected with the grommet holding portion 10a is constructed, for example, of an elastomer or an chloroprene rubber, although other natural and synthetic elastomeric materials may be used in alternative embodiments. The grommet has an insertion hole 20a with a predetermined depth to provide for the generally perpendicular crossing of each electric wire S of wiring harness W/H with respect to an insertion face 20d of the grommet. In addition, the grommet 20 has a thickness sufficient to hold the inserted wire S, and is provided with a lip-shaped stop portion 20b and a stop claw 20c to maintain the interconnection of the grommet 20 with the grommet mounting hole 10c of the grommet holder 10.

Figure 2:
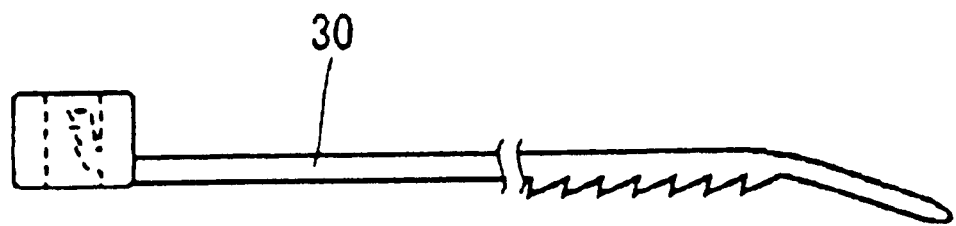
FIG. 2 shows a side schematic diagram of a binder used as a fastening device of the present invention.

The fastening device used for fastening the wiring harness W/H may be a conventional binder 30 as shown in FIG. 2. However, other fastening devices may be used in alternative embodiments. The width of binder 30 is smaller than the width of the notch 10e of the wiring harness fastening portion 10b, thereby maintaining the fastening position of the wiring harness W/H by the binder 30.

To bend the wiring harness W/H by the grommet holder 10, each wire S of wiring harness W/H is inserted into an insertion hole 20a of the grommet 20 which is in turn interconnected with the grommet mounting hole 10c, to a position where the wires may be appropriately connected with a device to be wired (not shown). Alternatively, after inserting the wires S of the wiring harness W/H into the grommet 20 to a predetermined position, the grommet 20 may then be interconnected with the grommet holder 10.

The wiring harness W/H may then be fastened to the wiring harness fastening portion 10b by the binder 30. The wiring harness W/H may be fastened in an appropriately bent configuration, without drooping, between the grommet 20 and the binder 30, and without being under linear tension. Therefore, when the penetration holes 10d are provided, the grommet holder 10 may be fastened to the device to be wired by inserting a bolt through a penetration hole 10d of the grommet holder 10.

The direction of each wire S of the wiring harness W/H is regulated, by being positioned in the grommet 20 through an insertion hole 20a. Each wire S is generally perpendicular to the grommet holding portion 10a, and the wiring harness W/H is bent at angle Y with respect to the connection portion 10g by fastening the wiring harness to the wiring harness fastening portion 10b.

When fastening the grommet holder 10 to a device to be wired, no load is borne by the connecting portion 10g between the wires S and the device, because the grommet holder 10 bears the load through the grommet 20. Connection can thus be carried out by a connecting method that is weak in resistance to force, such as soldering.

Figure 3A:
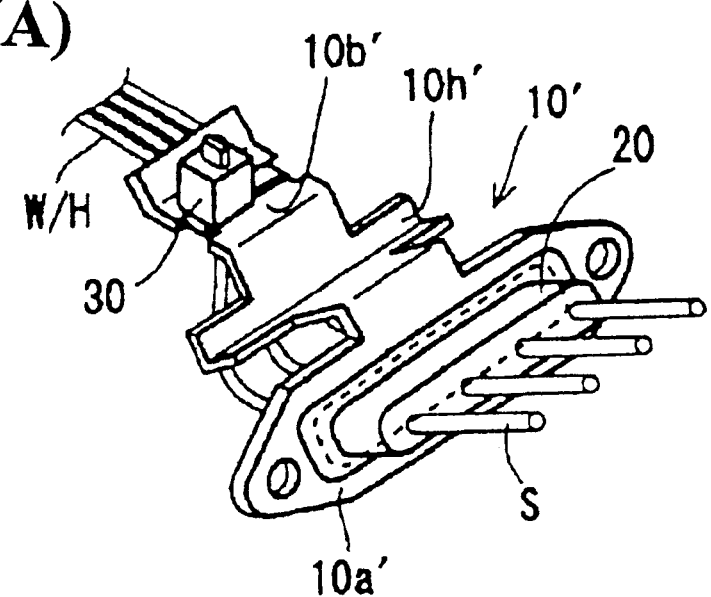
FIG. 3(A) shows a perspective view of a grommet holder according to a second embodiment of the present invention.
Figure 3B:
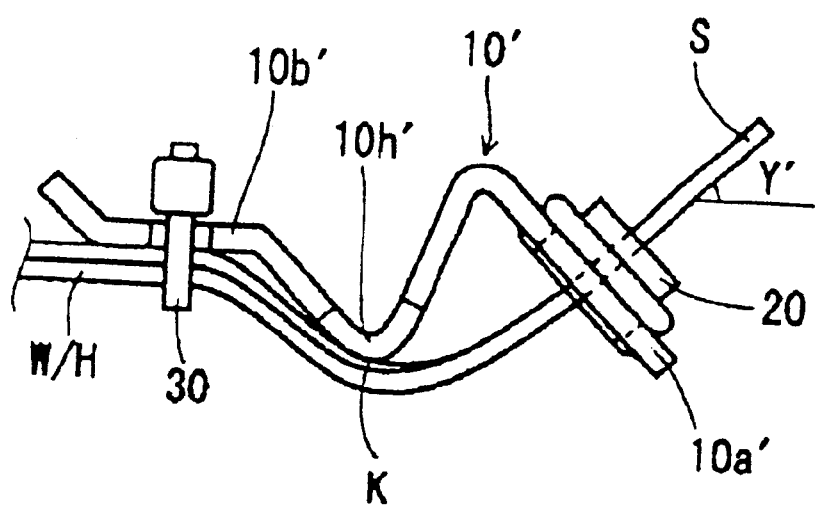
FIG. 3(B) shows a side elevational view of a grommet holder according to the second embodiment.

FIGS. 3(A) and 3(B) show a grommet holder 10' according to a second embodiment of the invention, which is integrally provided with a generally V-shaped bent portion 10h' extending generally perpendicularly between a grommet holding portion 10a' and a wiring harness fastening portion 10b'. As shown in FIG. 3(A), the width of the bent portion 10h' extends a greater distance than the width to which the wires S extend, thereby ensuring that the wires stay below the bent portion 10h'. Other portions are the same as those in the first embodiment.

To bend the wiring harness W/H by grommet holding portion 10' (in the same manner as with the first embodiment), the wiring harness W/H is inserted into a grommet 20 which is interconnected with the grommet holding portion 10a'. A bending point K is provided by the V-shape bent portion 10h' (as shown in FIG. 3(B)). A binder 30 fastens the wiring harness W/H to the wiring harness fastening portion 10b'. The bending angle Y' of wiring harness W/H may be set in reference to a relative angle between the grommet holding portion 10a' and the wiring harness fastening portion 10b'.

Since the wiring harness W/H is bent at the bent portion 10h' and each wire S of wiring harness W/H is generally perpendicular to the grommet holding portion 10a', a biasing force which would otherwise return the wiring harness W/H to a linear position is not transferred to the grommet, thereby enhancing the interconnection of the wiring harness with the grommet holding portion 10a' without deformation of the grommet 20.

Figure 4A:
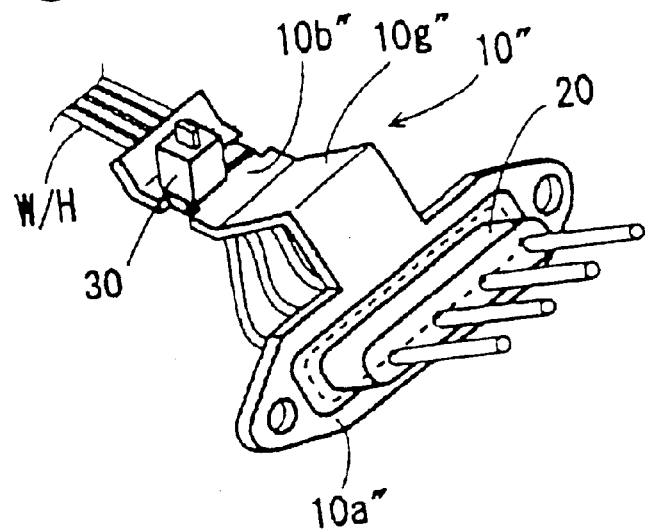
FIG. 4(A) shows a perspective view of a grommet holder according to a third embodiment of the present invention.
Figure 4B:
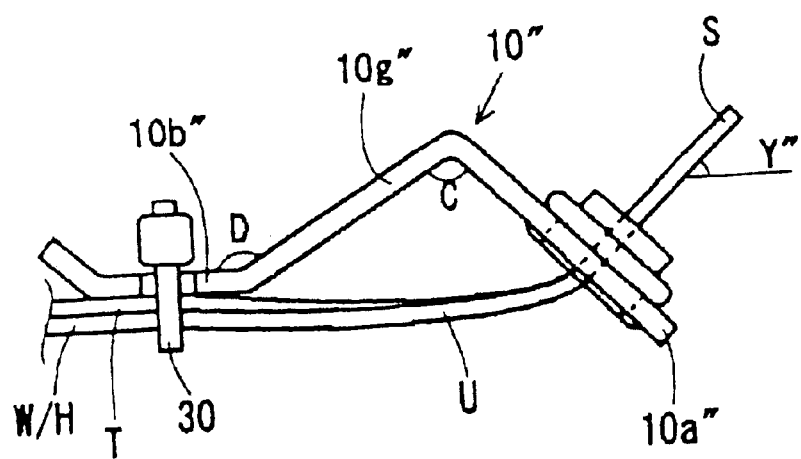
FIG. 4(B) shows a side elevational view of a grommet holder according to the third embodiment.
Figure 5:
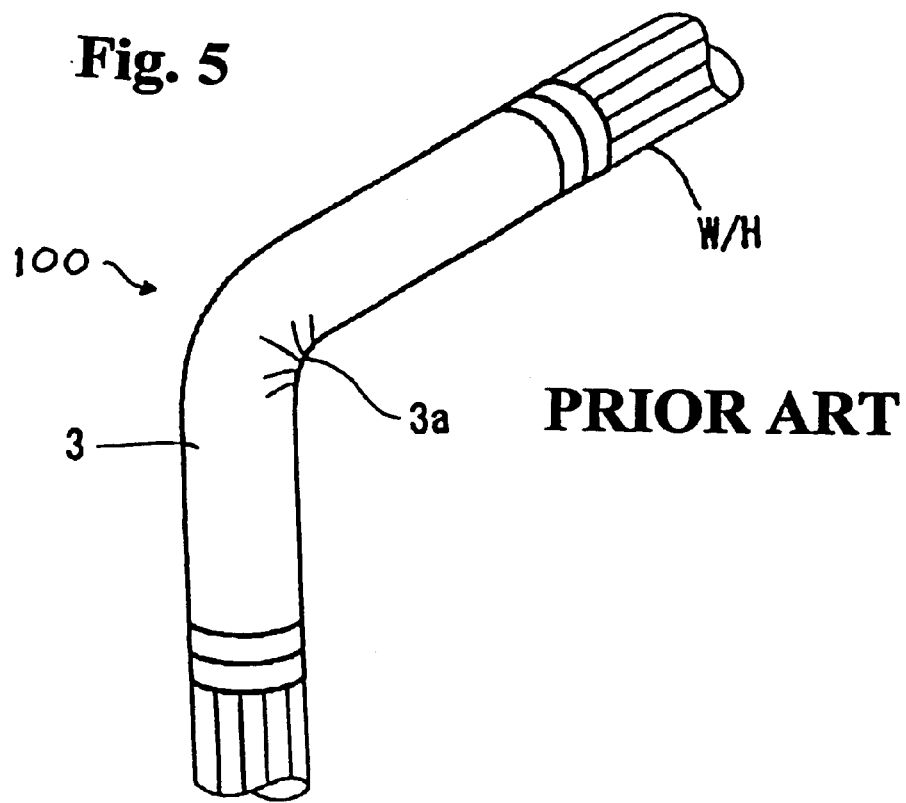
FIG. 5 shows a perspective view of a bent known wiring harness.
Figure 6:
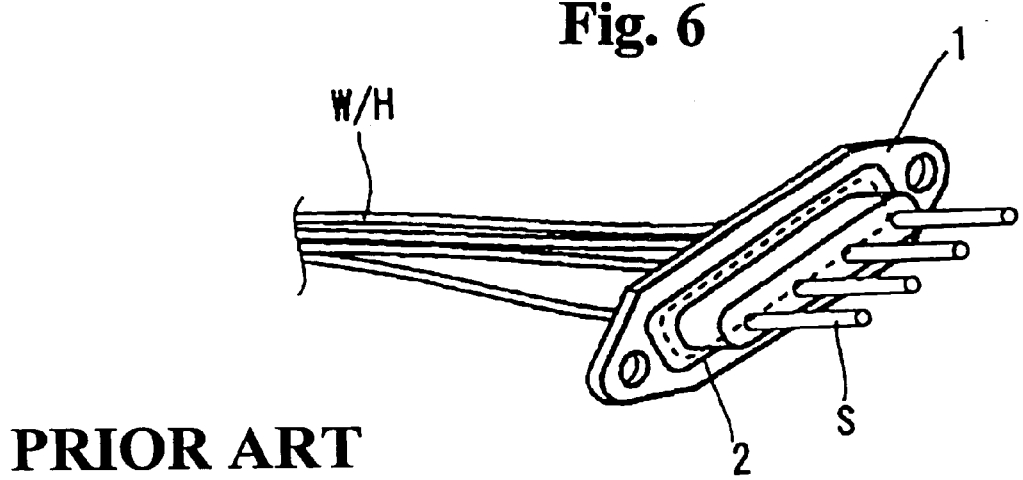
FIG. 6 shows a perspective view of a connection portion of the known wiring harness.

FIG. 4(A) and FIG. 4(B) show a grommet holder 10" according to a third embodiment of the invention. As in the first embodiment, the grommet holder 10" has a grommet holding portion 10a" and a wiring harness fastening portion 10b". A connecting portion 10g" connects the grommet holding portion 10a" and the wiring harness fastening portion 10b". A first end of the connecting portion 10g" forms a generally perpendicularly extending L-shaped member with the grommet holding portion 10a", and forms an angle C therebetween (as shown in FIG. 4(B)). A second end of the connecting portion 10g" connects the connecting portion 10g" with the fastening portion 10b", forming another predetermined angle D.

To bend a wiring harness W/H by the grommet holding portion 10", (performed in the same manner as with the first embodiment), the wiring harness W/H is inserted into a grommet 20 which in turn interconnects with the grommet holding portion 10a". The wiring harness W/H is fastened to the wiring harness fastening portion 10b" by a binder 30. Other portions are the same as those in the first embodiment. The bending angle Y" of the wiring harness W/H can be set in accordance with predetermined angle C, predetermined angle D, and/or a length of the connecting portion 10g".

In addition, the grommet holder 10" can position a bent portion U of wiring harness W/H higher than the horizontal portion T of the wiring harness W/H depending on angle C, angle D, and/or connecting portion 10g". Therefore, the grommet holder 10" allows the wiring harness W/H to be bent without interference from other parts of a device to be wired.

Furthermore, when positioning the bent portion U of wiring harness W/H higher than the horizontal portion T, the wiring harness W/H is not bent at the fastening portion 10b" of binder 30, but becomes smooth bent portion U, thus reducing the load resulting from bending. Moreover, the linear restoring biasing force of the wiring harness W/H acting against the grommet 20 is reduced.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects.

Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in Japanese Utility Model Application No. JP 10-212581 filed on Jul. 28, 1998, which is expressly incorporated herein by reference in its entirety.

What is claimed is:

1. A grommet holder, comprising:
   a grommet holding portion having a grommet mounting hole configured to interconnect with a grommet, the grommet configured to accept a wiring harness therein; and
   a wiring harness fastening portion integrally connected to said grommet holding portion via a connecting portion forming an angle of at least 90° with respect to said grommet holding portion;
   wherein the wiring harness may be affixed to said wiring harness fastening portion by a fastening device.

2. The grommet holder according to claim 1, further comprising a penetration hole provided on said grommet holding portion configured to accept a fastening member therethrough.

3. A grommet holder, comprising:
   a grommet holding portion having a grommet mounting hole configured to interconnect with a grommet, the grommet configured to accept a wiring harness therein;
   a wiring harness fastening portion integrally connected to said grommet holding portion, and forming a predetermined angle with respect to said grommet holding portion; and
   a generally V-shaped bent portion extending between said grommet holding portion and said wiring harness fastening portion;
   wherein said V-shaped bent portion provides for the bending of the wiring harness in contact with the point of said V-shaped bent portion, and further providing for the bending of the wiring harness in a direction generally perpendicular to said grommet holding portion; and
   wherein the wiring harness may be affixed to said wiring harness fastening portion by a fastening device.

4. The grommet holder according to claim 3, wherein:
   said grommet holding portion has a width; and
   said generally V-shaped bent portion extends along a direction generally parallel to said width of said grommet holding portion.

5. The grommet holder according to claim 4, wherein said generally V-shaped bent portion extends beyond said width of said grommet holding portion.

6. The grommet holder according to claim 3, further comprising a penetration hole provided on said grommet holding portion configured to accept a fastening member therethrough.

7. A grommet holder, comprising:
   a grommet holding portion having a grommet mounting hole configured to interconnect with a grommet, the grommet configured to accept a wiring harness therein;
   a wiring harness fastening portion; and
   a connecting portion connecting said grommet holding portion to said wiring harness fastening portion, said connecting portion having a first end forming a generally perpendicularly extending L-shaped member with said grommet holding portion, said connecting portion further having a second end connected to said fastening portion;
   wherein the wiring harness may be affixed to said wiring harness fastening portion by a fastening device.

8. The grommet holder according to claim 4, further comprising a penetration hole provided on said grommet holding portion configured to accept a fastening member therethrough.

9. A method of bending a wiring harness using a grommet holder, the grommet holder having a grommet holding portion having a grommet mounting hole and a wiring harness fastening portion integrally connected to the grommet holding portion and forming a predetermined angle with respect to the grommet holding portion, the wiring harness having a plurality of wires, and the grommet having a plurality of insertion holes each configured to accept a wire therethrough, the method comprising:
   inserting a wire of the wiring harness through a respective insertion hole;
   inserting the grommet into the grommet mounting hole; and
   fastening the wiring harness to the wiring harness fastening portion such that the predetermined angle applies a bend to the wiring harness.

10. The method of bending a wiring harness using a grommet holder according to claim 6, further comprising bending the wiring harness by contacting the wiring harness with a bent portion of the grommet holder.

* * * * *

UNITED STATES PATENT AND TRADEMARK OFFICE
CERTIFICATE OF CORRECTION

PATENT NO.    : 6,259,028 B1                                        Page 1 of 1
DATED         : July 10, 2001
INVENTOR(S)   : S. Senma It is certified that error appears in the above-identified patent and that said Letters Patent is hereby corrected as shown below:

<u>Column 6,</u>
Line 42, "claim 4" should be -- claim 7 --.

Signed and Sealed this

Fourteenth Day of May, 2002

*Attest:*

*Attesting Officer*

JAMES E. ROGAN
*Director of the United States Patent and Trademark Office*